US012208058B2

(12) United States Patent
Mason et al.

(10) Patent No.: US 12,208,058 B2
(45) Date of Patent: Jan. 28, 2025

(54) CHEST COMPRESSION RAIL SYSTEM AND METHODS FOR USING SAME

(71) Applicants: Mitchell Keith Mason, Houston, TX (US); Robert Edward Kerber, Houston, TX (US)

(72) Inventors: Mitchell Keith Mason, Houston, TX (US); Robert Edward Kerber, Houston, TX (US)

( * ) Notice: Subject to any disclaimer, the term of this patent is extended or adjusted under 35 U.S.C. 154(b) by 814 days.

(21) Appl. No.: 17/343,098

(22) Filed: Jun. 9, 2021

(65) Prior Publication Data

US 2021/0386619 A1 Dec. 16, 2021

Related U.S. Application Data

(60) Provisional application No. 63/037,093, filed on Jun. 10, 2020.

(51) Int. Cl.
*A61H 31/00* (2006.01)
*A61G 1/048* (2006.01)

(52) U.S. Cl.
CPC ........... *A61H 31/006* (2013.01); *A61G 1/048* (2013.01); *A61H 31/008* (2013.01); *A61G 2203/78* (2013.01); *A61H 2201/0119* (2013.01); *A61H 2201/0157* (2013.01)

(58) Field of Classification Search
CPC ................ A61H 31/006; A61H 31/008; A61H 2201/0119; A61H 2201/0157; A61H 2201/0142; A61H 2031/001; A61H 2031/002; A61H 1/001–0255; A61H 2203/0456–0468; A61G 7/1034; A61G 7/1038; A61G 7/1042; A61G 1/048; A61G 7/0507; A61G 1/04; A61G 3/02; A61G 3/0841; A61G 2203/78; A61G 2203/80
See application file for complete search history.

(56) References Cited

U.S. PATENT DOCUMENTS 3,739,771 A * 6/1973 Gaquer ................ A61H 31/008
601/41
4,369,982 A * 1/1983 Hein .................... A61G 1/0225
5/628

(Continued)

FOREIGN PATENT DOCUMENTS

DE 10121130 A1 * 1/2003 ........... A61B 5/0555

OTHER PUBLICATIONS

DE 10121130 machine translation (Year: 2001).*

*Primary Examiner* — Michael R Reid
*Assistant Examiner* — Sara K Toich
(74) *Attorney, Agent, or Firm* — Edmonds & Cmaidalka, P.C.

(57) ABSTRACT

A removeable and easily attachable/detachable rail system for use with chest compression devices and portable patient carrier boards. The rail system can include an elongated grooved structure providing multiple points of attachment for a chest compression device. The elongated grooved structure is removably affixed to the carrier board using one or more clamp mechanisms adapted to engage a side panel or hand hole of the board. The rail system allows first responders the ability to quickly and efficiently provide cardiopulmonary resuscitation assistance to a patient, while allowing for faster patient transport.

15 Claims, 4 Drawing Sheets

(56) References Cited

U.S. PATENT DOCUMENTS

| | | | | | |
|---|---|---|---|---|---|
| 5,819,339 | A * | 10/1998 | Hodgetts | A61G 5/006 | 5/88.1 |
| 6,061,853 | A * | 5/2000 | Laaksonen | A61G 1/007 | 5/628 |
| 2012/0042881 | A1* | 2/2012 | Paulussen | A61H 31/008 | 601/41 |
| 2012/0238922 | A1* | 9/2012 | Stemple | A61H 31/006 | 601/41 |
| 2012/0241571 | A1* | 9/2012 | Masionis | A61G 1/04 | 248/225.11 |
| 2014/0121576 | A1* | 5/2014 | Nilsson | A61H 31/008 | 601/41 |
| 2016/0324702 | A1* | 11/2016 | Smeed | F16M 13/02 | |
| 2018/0000666 | A1* | 1/2018 | Sirkin | F16M 13/02 | |
| 2018/0110667 | A1* | 4/2018 | Freeman | A61G 13/04 | |

* cited by examiner

CHEST COMPRESSION RAIL SYSTEM AND METHODS FOR USING SAME

CROSS-REFERENCE TO RELATED APPLICATION

This application claims priority to U.S. Provisional Patent Application No. 63/037,093, filed on Jun. 10, 2020, which is incorporated by reference herein.

BACKGROUND

Field of the Invention

Embodiments of the present disclosure generally relate to a rail system and attachment to combine a chest compression device for cardiopulmonary resuscitation, with a scoop type patient carrier for transportation of the patient.

Description of the Related Art

The invention relates to utilization of a chest compression device for use in cardiopulmonary resuscitation (CPR) and the issues faced when attempting to transport the patient while still requiring CPR to continue. Sudden cardiac arrest (SCA) outside the hospital is a leading cause of death in the western world, and globally the incidence is estimated to 55 per 100 000 person-years. The number of patients surviving to hospital discharge remains low. A recent meta-analysis stated the aggregate survival rate to hospital discharge to be 7.6%, which has not significantly changed in almost 30 years.

The use of an automated compression device in paramedical procedure when providing cardiopulmonary resuscitation (CPR) is preferred over manual compressions. When performing manual compressions, paramedics and first responders are required to switch every 5 minutes to prevent fatigue. As a paramedic gets tired, the quality of compressions decline quickly, and the rate of compressions slow as well. Therefore, manual CPR is inefficient.

A conventional style of automated chest compression device has a support structure for placement about a patient's chest and for holding a chest compressor above a patient's sternum; a chest compressor mounted on the support structure; and lateral chest supports attached to the support structure at points that are laterally either side of the chest when the device is in use, such that the lateral chest supports will apply lateral pressure to the sides of the chest synchronized with a chest compression by the chest compressor.

With that being said, the automated compressors can be independently inefficient if transport is required when responding to an emergency. The reason that the devices are inefficient is because paramedics cannot seamlessly transport a patient to the transport vehicle when they are connected to the automated compression device apparatus.

In a typical scenario, a patient is lying unconscious in the bedroom of their home, upon arrival the EMT will discern a plan of action. Upon determining that the patient requires CPR, an automated chest compression device will be attached to the patient; the support structure is placed underneath the patient, and the lateral supports that hold the chest compressor will be affixed to the support structure; and CPR will begin. Once it is deemed necessary to transport the patient to the ambulance, the automated chest compression system is removed and manual compressions are given in its place. A patient carrier is then placed underneath the patient, while manual compressions continue. Once in the ambulance and the patient has been transferred from the patient carrier to the gurney, the automated chest compression device can once more be placed about the patient and automated compressions resume.

There is need, therefore, for a new system and process for transporting and resuscitating a patient without removing any automated compression systems.

SUMMARY

Rail systems and attachment systems for supporting a cardiopulmonary resuscitation (CPR) device as well as methods for using same are provided herein. The rail system can include an elongated base structure having a plurality of recessed areas formed along an outer surface thereof. The base structure can have a first diameter and each recessed area can have a second diameter that is less than the first diameter. At least one clamp mechanism can be disposed about the elongated base structure, and the clamp mechanism can be configured to attach to the elongated base structure at any one or more of the recessed areas.

A back board for supporting a cardiopulmonary resuscitation (CPR) device is also provided. The back board can include a generally flat board having a first and second linear channel formed about opposing sides thereof. A rail system can be disposed within each linear channel, each rail system having an elongated base structure with a plurality of recessed areas formed along an outer surface thereof. The base structure has a first diameter and each recessed area has a second diameter that is less than the first diameter.

BRIEF DESCRIPTION OF THE DRAWINGS

So that the manner in which the above recited features of the present invention can be understood in detail, a more particular description of the invention, briefly summarized above, can be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. It is emphasized that the figures are not necessarily to scale and certain features and certain views of the figures can be shown exaggerated in scale or in schematic for clarity and/or conciseness.

DETAILED DESCRIPTION

Figure 1:
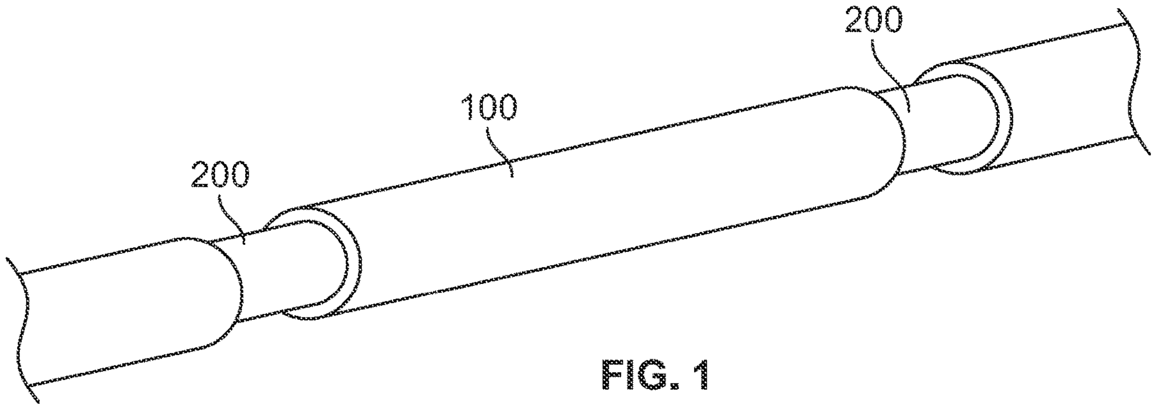
FIG. 1 depicts an enlarged perspective view of an illustrative elongated structure of the rail system, according to one or more embodiments provided herein.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure can repeat reference numerals and/or letters in the various embodiments and across the figures provided herein. This repetition is for the purpose of simplicity and clarity and does not in itself dictate a relationship between the various embodiments and/or configurations. Moreover, the formation of a first feature over or on a second feature in the description that follows can include embodiments in which the first and second features are formed in direct contact, and can also include embodiments in which additional features can be formed interposing the first and second features, such that the first and second features are not in direct contact. Finally, the embodiments presented below can be combined in any combination of ways, i.e., any element from one embodiment can be used in any other embodiment, without departing from the scope of the disclosure.

Additionally, certain terms are used throughout the following description and claims to refer to particular components. As one skilled in the art will appreciate, various entities can refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to."

All numerical values in this disclosure can be exact or approximate values unless otherwise specifically stated. Accordingly, various embodiments of the disclosure can deviate from the numbers, values, and ranges disclosed herein without departing from the intended scope. Furthermore, the term "or" is intended to encompass both exclusive and inclusive cases, i.e., "A or B" is intended to be synonymous with "at least one of A and B," unless otherwise expressly specified herein.

The indefinite articles "a" and "an" refer to both singular forms (i.e., "one") and plural referents (i.e., one or more) unless the context clearly dictates otherwise.

The terms "up" and "down"; "upward" and "downward"; "upper" and "lower"; "upwardly" and "downwardly"; "above" and "below"; and other like terms as used herein refer to relative positions to one another and are not intended to denote a particular spatial orientation since the apparatus and methods of using the same can be equally effective at various angles or orientations.

A detailed description of the present invention will now be provided. Each of the appended claims defines a separate invention, which for infringement purposes is recognized as including equivalents to the various elements or limitations specified in the claims. Depending on the context, all references to the "invention" may in some cases refer to certain specific embodiments only. In other cases, it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this disclosure is combined with publicly available information and technology.

A rail system for attaching and securing a cardiopulmonary resuscitation (CPR) device or automated chest compression device to a patient carrier board is provided herein. Any patient carrier board can be used, including a scoop type patient carrier or common back board. For example, the Scoop Type Patient Carrier System manufactured and developed by Hartwell Medical LLC can be retrofitted using the rail system described.

Figure 2:
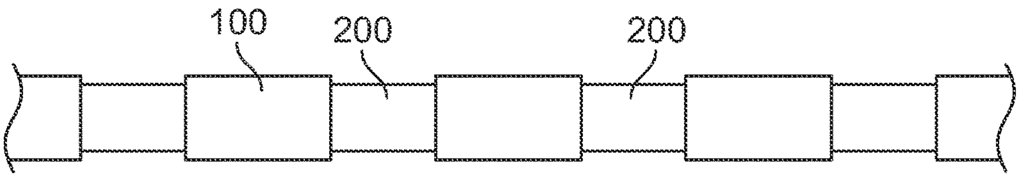
FIG. 2 depicts a side view of the rod shown in FIG. 1, according to one or more embodiments provided herein.

The rail system can include an elongated base structure and at least one clamp mechanism. FIG. 1 depicts an enlarged perspective view of an illustrative elongated base structure 100, according to one or more embodiments and FIG. 2 depicts a side view of the base structure 100 shown in FIG. 1, according to one or more embodiments provided herein. Referring to FIGS. 1 and 2, the elongated base structure 100 can be any a rod, stick, wand, staff, pipe, board or other rigid device that provides a point of attachment for the clamp 300.

The elongated base structure 100 can include two or more recessions, grooves, indentions, or other smaller diameter sections 200 that are spaced axially across the length of the base structure 100. These grooves, indentions, or smaller diameter sections 200 can be disposed on or about the base structure 100 or can be machined or otherwise formed within the base structure 100. The spacing between the grooves 200 can vary or can be the same throughout. For example, the spacing between any two grooves 200 can range from a low of about 1 in., about 2 in., or about 3 in. to a high of about 4 in., about 5 in., or about 10 in. apart.

Figure 3:
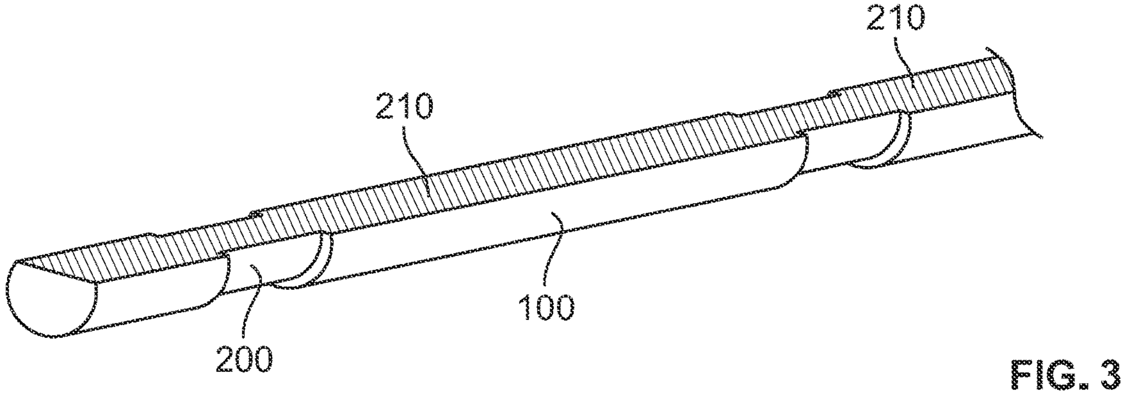
FIG. 3 depicts a schematic view of an alternative elongated base structure, according to one or more embodiments provided herein.

FIG. 3 depicts a schematic view of an alternative elongated base structure 100 having a flat outer surface, opposed to a rounded exterior. In this embodiment, the elongated base structure 100 can have a flat upper surface 210, or flat lower surface, or both. The flat surface 210 can provide increased versatility by providing, for example, a better fitting surface for engaging the clamp mechanism 300 when disposed on the elongated base structure 100. The clamp mechanism 300, for example, can include a flat engagement surface that is sized to fit and engage the flat surface 210 on the base structure 100. The engagement of two flat surfaces is thought to provide less slippage and prevent rotation when downward forces are acted thereon.

Figure 4:
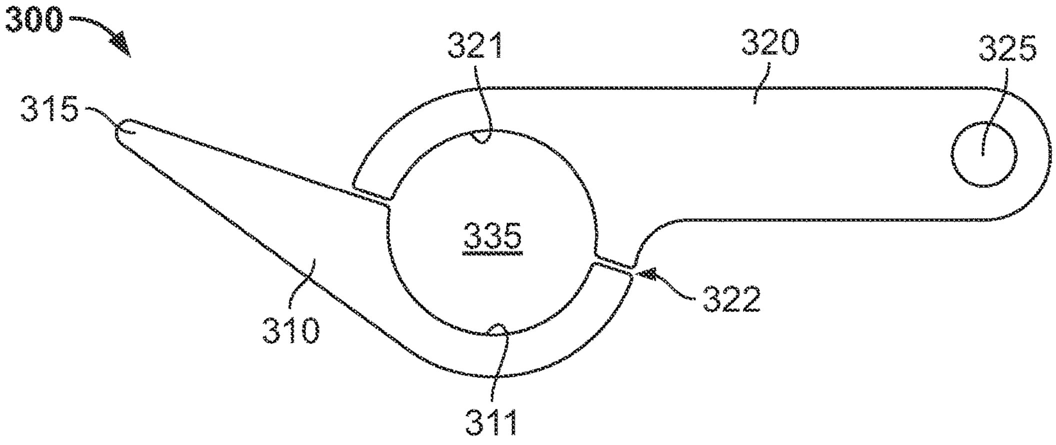
FIG. 4 depicts an illustrative side schematic of a clamp device that can be used with the rail system, according to one or more embodiments provided herein.
Figure 6:
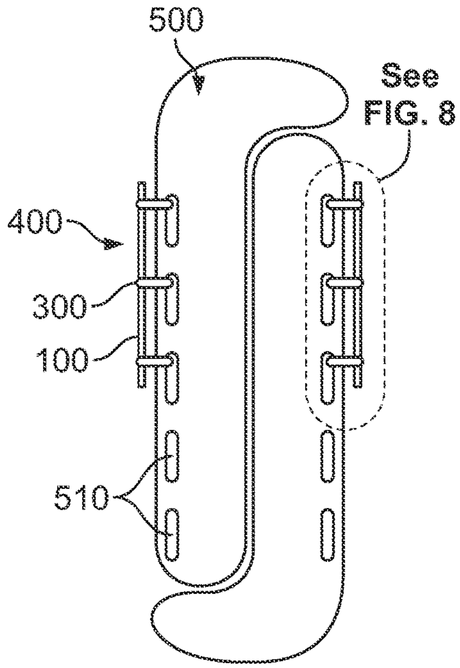
FIG. 6 depicts an illustrative plan view of the rod and clamp system disposed on a scoop type patient carrier, according to one or more embodiments described.
Figure 7:
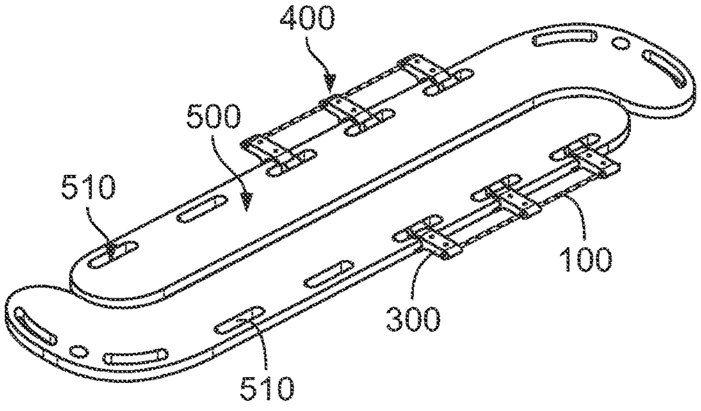
FIG. 7 depicts another illustrative perspective view of the assembled board of FIG. 5, according to one or more embodiments described.

FIG. 4 depicts an illustrative side schematic of a clamp mechanism 300 that can be used with the elongated base structure 100, according to one or more embodiments. The clamp mechanism 300 can include a first jaw portion or section 310 and a second jaw section or portion 320. The first jaw portion 310 and the second jaw portion 320 can be monolithic or can be two or more separate components that are connected or otherwise attached together. Each jaw section 310, 320 can include a curved or contoured portion 311, 321 that defines a first aperture or opening 335. In use, the jaw sections 310, 320 can straddle or otherwise fit over and grasp a hand hole of a patient carrier, as shown in FIGS. 6 and 7. Alternatively, the jaw sections 310, 320 can attach to any flat surface on the side of the carrier. In certain embodiments, the clamp mechanism 300 can include a locking hinge or pivot 322 that connects the first jaw portion 310 to the second jaw portion 320.

Figure 5:
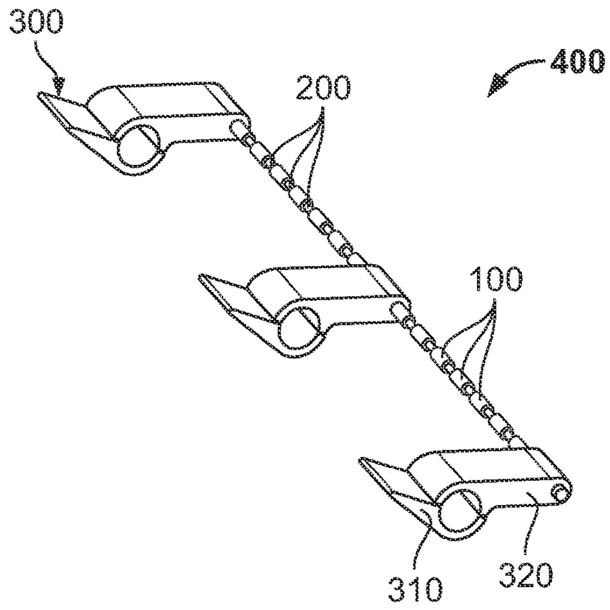
FIG. 5 depicts an illustrative schematic view of three clamp devices of FIG. 3 that are attached to the rod of FIG. 1, according to one or more embodiments provided herein.

FIG. 5 depicts an illustrative schematic view of three clamp mechanisms 300 attached to a single elongated base structure 100 to provide an assembled rail system 400, according to one or more embodiments. Referring to FIGS. 4 and 5, the first section 310 can be configured to rest against a lower surface or backside of the patient board (not shown) and bias against the board when in use as described in more detail below. The first section 310 can further have an extended lip 315 that counters a downforce of a suitable compression device when used with a patient carrier. The second section 320 can include a second aperture or other opening 325 for sliding across the base structure 100. The second section 320 can then be bolted or otherwise secured to the base structure 100. The second section 320 can be sized and configured to rest on top of the board. Once assembled, the first and second sections 310, 320 provide a secure attachment to the board. In certain embodiments, each clamp mechanism 300 can be extendable or configured to telescope within itself, so as to adjust the overall length of the clamp 300, which determines the distance between the opening 325 to the extended lip 315.

Figure 8:
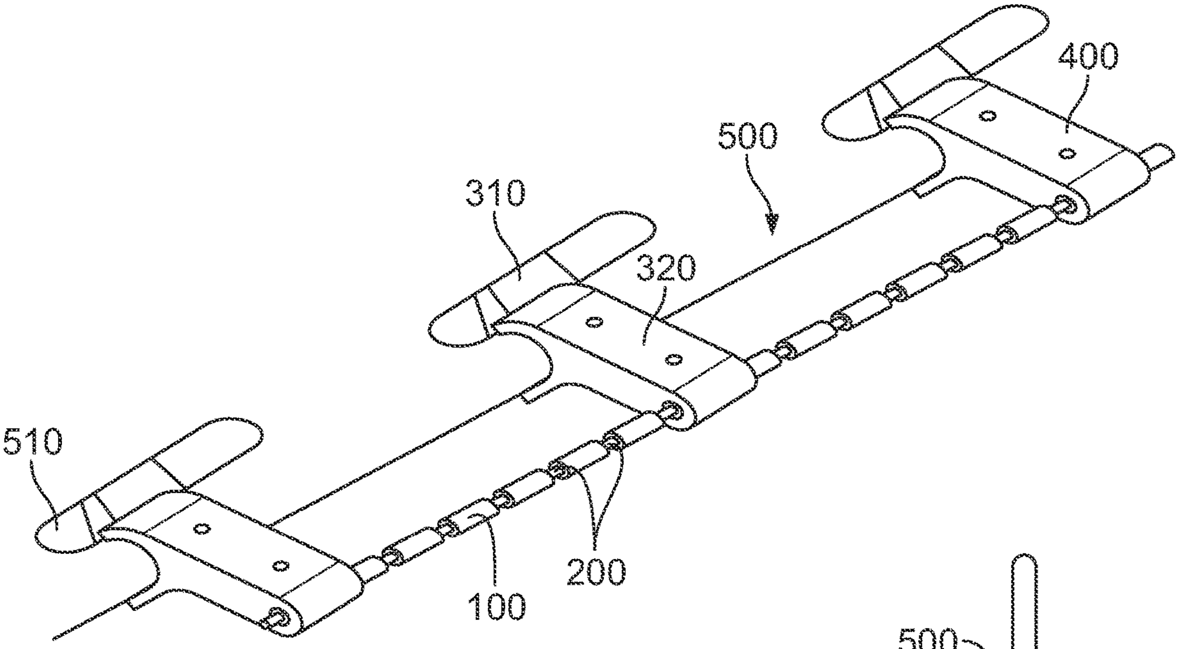
FIG. 8 depicts an enlarged, illustrative schematic view of the right side of the assembled board depicted in FIGS. 6 and 7.

FIG. 6 depicts an illustrative plan view of the assembled rail system 400 disposed on a scoop type patient carrier 500, according to one or more embodiments. FIG. 7 depicts another illustrative perspective view of the patient carrier 500 when assembled with the base structure 100 and clamp mechanisms 300, and FIG. 8 depicts an enlarged view of the right side of the assembled board depicted in FIG. 6. Referring to FIGS. 6-8, the first and section sections 310, 320 of the clamp mechanism 300 can be placed about a hand-hole 510 and secured to one another, holding the clamp mechanism 300 in place. The rail system 400 can have any number of clamp mechanisms 300 for securing the base structure 100 to the patient board. Three clamp mechanisms 300 are shown, but two or four or more can be used, depending on the length of the base structure 100 and/or size/weight of the patient to be transported.

Figure 9:
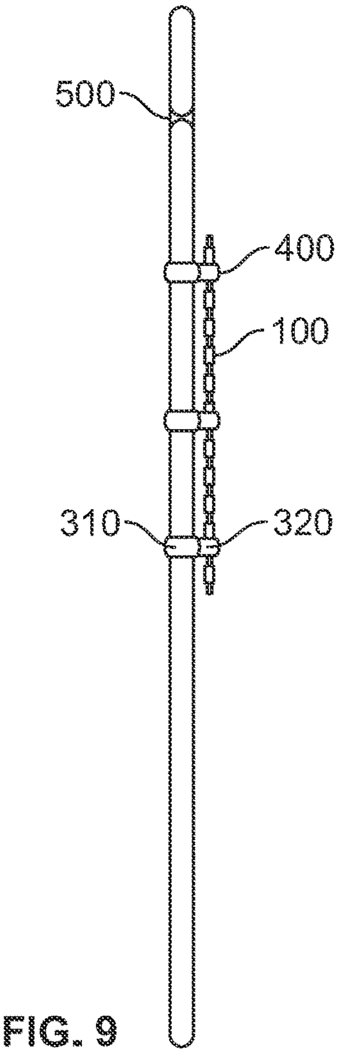
FIG. 9 depicts an illustrative side view of the assembled board depicted in FIGS. 6 and 7, according to one or more embodiments described.
Figure 10:
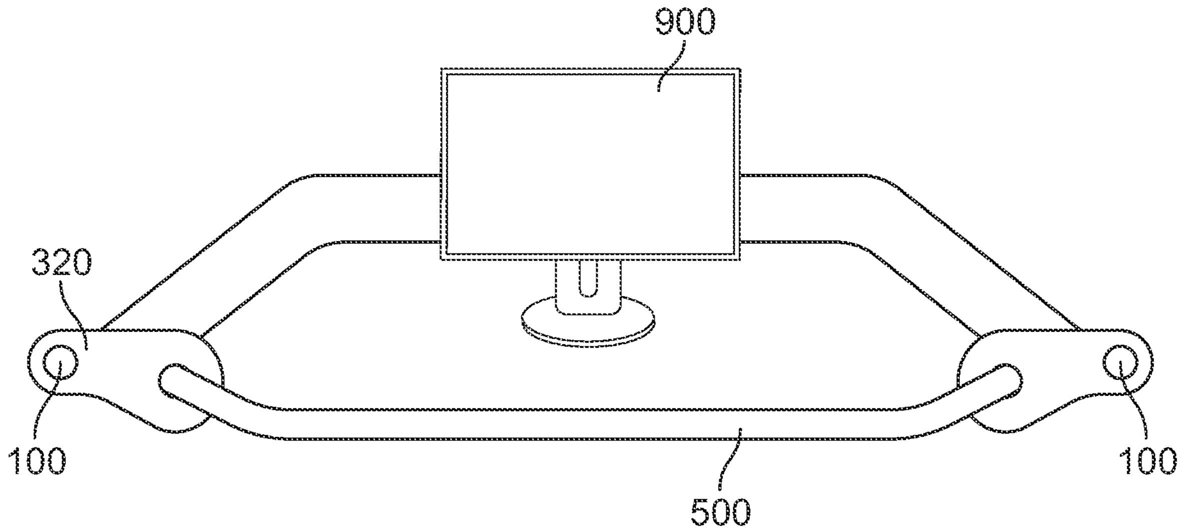
FIG. 10 depicts an illustrative end view of a back board that is connected with the rail system and an illustrative chest compression system, according to one or more embodiments described.

FIG. 9 depicts an illustrative side view of the assembled board 500 depicted in FIGS. 6 and 7, and FIG. 10 depicts an illustrative end view of the assembled board 500 depicted in FIGS. 6 and 7, according to one or more embodiments described.

Because the clamp mechanisms 300 are removable, the elongated base structure 100 can be located anywhere about the length of the patient board 500. This allows the board 500 to better accommodate patient size in terms of height, girth and body shape, which allows first responders to locate the patient anywhere on the board 500 to make transportation easier, without sacrificing the efficacy of the compression device.

Referring to FIGS. 6 and 10, the rail system 400 can be used to secure any type of automated chest compression system 900 to a patient board 500. Suitable automated chest compression systems 900 include, but are not limited to, compression systems that are commercially available from Lucas and Defibtech Lifeline. These are arch type systems that include an arched base support with a mechanically operated compression piston that moves up and down against the sternum of a patient, as depicted in FIG. 10. Such systems 900 can be easily attached to the rail system 400 using the existing clamps or other attachment devices of the compression system itself without further modification and can be easily removed from the patient carrier 500 when not needed or in the way.

The ability to quickly and easily attach and remove chest compression systems 900 to a patient carrier 500 utilizing the rail system 400 described can provide an efficient lifesaving solution. It should be appreciated that time is of the essence when attending to and transporting patients in need of cardiopulmonary resuscitation. The rail system 400 provides for the quick attachment and release of a compression system to patient boards with little or no assembly time and without tools. The rail system 400 also has a low profile such that the rail system 400 can remain affixed to any patient board when not in use and stored in an ambulance, fire truck, or other first response vehicle. The rail system 400 also does not have to be removed when used with the two-piece scoop type patient boards.

Figure 11:
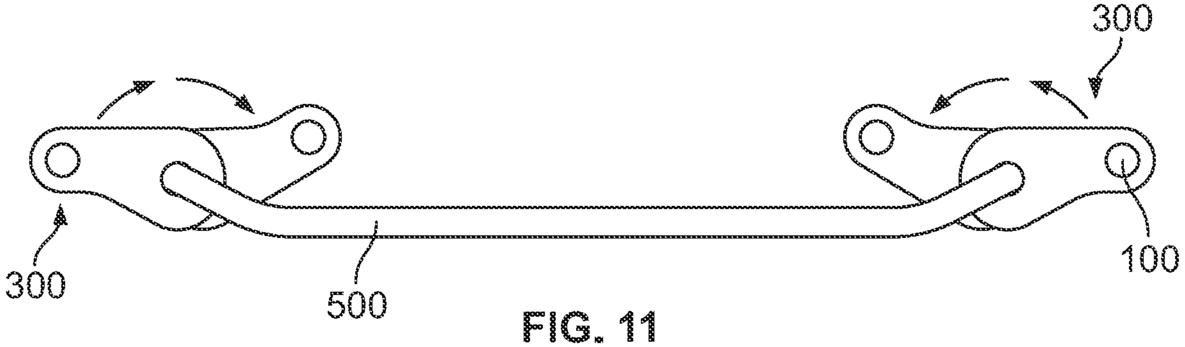
FIG. 11 depicts an illustrative end view of a board, showing the clamp mechanism's ability to rotate inward while not in use, according to one or more embodiments described.

FIG. 11 depicts an illustrative end view of the assembled board 500, showing the clamp mechanism 300 rotating inward while not in use. This configuration allows for easier transportation and stowage when a chest compression system 900 is not connected to the rail system 400.

Figure 12:
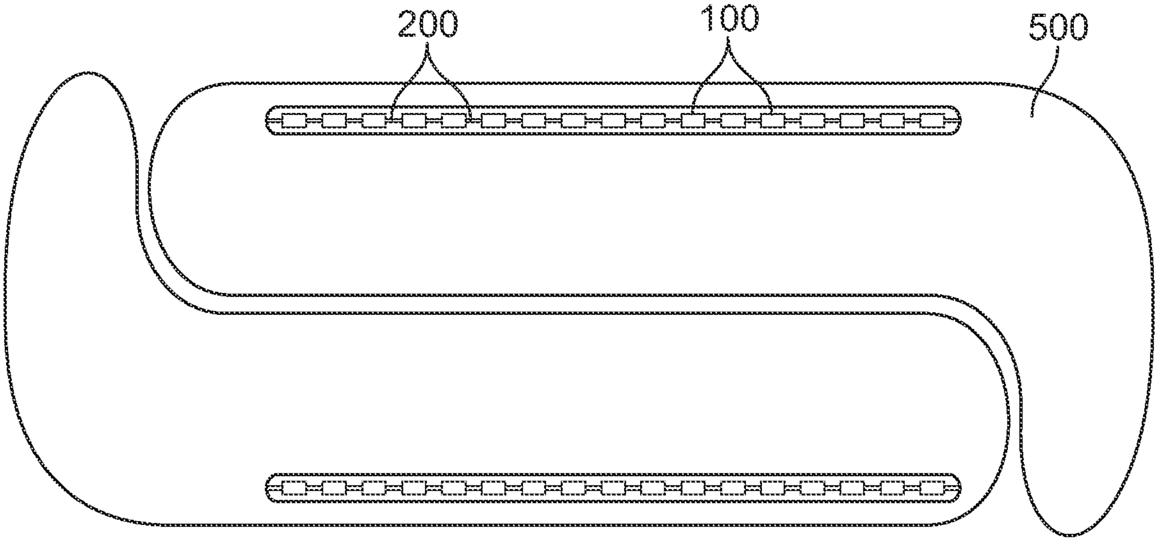
FIG. 12 depicts an alternative design of a board whereby the elongated base structure is fabricated within the board itself, according to one or more embodiments described.

FIG. 12 depicts an alternative design of an assembled board 500, whereby the elongated support structure 100 is integrated into the board 500. For example, an existing board 500 could be altered by removing a linear area between the hand holes and replaced with the elongated support structure 100. Alternatively, a new board could be made integral with the elongated support structure 100. In either case, the clamps 300 would not be required to attach a chest compression system 900 directly to the board 500.

The rail system 400 including the base structure 100 and clamps 300 can be made from any or more suitable materials capable of maintaining its rigidity and shape during chest compressions, so as to allow the integrity of the compressions to be consistent. Such suitable materials include but are not limited to any one or more metals (such as aluminum, steel, stainless steel, brass, nickel), metal alloys, fiberglass, wood, composite materials (such as ceramics, wood/polymer blends, cloth/polymer blends, etc.), and plastics (such as polyethylene, polypropylene, polystyrene, polyurethane, polyethylethylketone (PEEK), polytetrafluoroethylene (PTFE), polyamide resins (such as nylon 6 (N6), nylon 66 (N66)), polyester resins (such as polybutylene terephthalate (PBT), polyethylene terephthalate (PET), polyethylene isophthalate (PEI), PET/PEI copolymer) polynitrile resins (such as polyacrylonitrile (PAN), polymethacrylonitrile, acrylonitrile-styrene copolymers (AS), methacrylonitrile-styrene copolymers, methacrylonitrile-styrene-butadiene copolymers; and acrylonitrile-butadiene-styrene (ABS)), polymethacrylate resins (such as polymethyl methacrylate and polyethylacrylate), cellulose resins (such as cellulose acetate and cellulose acetate butyrate); polyimide resins (such as aromatic polyimides), polycarbonates (PC), elastomers (such as ethylene-propylene rubber (EPR), ethylene propylene-diene monomer rubber (EPDM), styrenic block copolymers (SBC), polyisobutylene (PIB), butyl rubber, neoprene rubber, halobutyl rubber and the like)), and mixtures, blends, or copolymers of any and all of the foregoing materials.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, meaning the values take into account experimental error, machine tolerances and other variations that would be expected by a person having ordinary skill in the art.

The foregoing has also outlined features of several embodiments so that those skilled in the art can better understand the present disclosure. Those skilled in the art should appreciate that they can readily use the present disclosure as a basis for designing or modifying other methods or devices for carrying out the same purposes and/or achieving the same advantages of the embodiments disclosed herein. Those skilled in the art should also realize that such equivalent constructions do not depart from the spirit and scope of the present disclosure, and that they can make various changes, substitutions, and alterations herein without departing from the spirit and scope of the present disclosure, and the scope thereof is determined by the claims that follow.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

What is claimed is:

1. A patient board, comprising:

a generally flat board having at least two handholes formed therein, the handholes configured for carrying or lifting the board;

an elongated base structure having a plurality of recessed areas formed along an outer surface thereof, wherein the outer surface has a first diameter and each recessed area has a second diameter that is less than the first diameter;

a first clamp mechanism disposed about a first location on the elongated base structure, the first location on the elongated base structure being a first recessed area or first area of the outer surface having the larger diameter;

a second clamp mechanism disposed about a second location on the elongated base structure, the second location on the elongated base structure being a second recessed area or second area of the outer surface having the larger diameter; and an automated chest compression system disposed on the elongated base structure, wherein the first and second clamp mechanisms are axially spaced apart from one another about the elongated base structure, and each clamp comprises a first end attached to the elongated based structure and a second end configured to attach to the generally flat board.

2. The patient board of claim 1, wherein the automated chest compression system is secured to the elongated base structure.

3. A back board for supporting a cardiopulmonary resuscitation (CPR) device, comprising:

a generally flat board;

a first and second linear channel formed within opposing sides of the flat board; and a rail system disposed within each linear channel, each rail system comprising an elongated base structure having a plurality of recessed areas formed along an outer surface thereof, wherein the base structure has a first diameter and each recessed area has a second diameter that is less than the first diameter.

4. The back board of claim 3, further comprising an automated chest compression system disposed on the elongated base structure.

5. The patient board of claim 1, wherein the automated chest compression system is coupled to any one of the recessed areas along the elongated base structure.

6. The patient board of claim 5, wherein the recessed areas of the outer surface of the elongated base structure prevent the coupled automated chest compression system from linear movement about the elongated base structure.

7. The patient board of claim 1, wherein the clamp mechanism is rotatable about the elongated base structure.

8. The back board of claim 3, wherein each of the first linear channel and the second linear channel are continuous openings formed within the opposing sides of the generally flat board, and a first rail system is located within the first linear channel and a second rail system is located within the second linear channel.

9. The back board of claim 3, further comprising at least one clamp mechanism attached to the elongated base structure at any of the areas of the outer surface having the larger first diameter or at any one or more of the recessed areas having the smaller second diameter.

10. The back board of claim 3, further comprising a cardiopulmonary resuscitation (CPR) device coupled to any one or more of the recessed areas of the elongated linear structure having the smaller second diameter.

11. The back board of claim 9, wherein the clamp mechanism attached to the elongated base structure is rotatable about the elongated base structure.

12. The back board of claim 3, wherein the elongated base structure has a circular cross section.

13. The back board of claim 3, wherein the elongated base structure has a flat outer surface, providing a flat engagement surface for engaging a flat surface of a cardiopulmonary resuscitation (CPR) device.

14. The patient board of claim 1, wherein the elongated base structure has a flat outer surface, providing a flat engagement surface for engaging a flat surface of the automated chest compression system.

15. The patient board of claim 1, wherein the at least two handholes are formed on opposite sides of the board, and the board has at least one more handhole formed on each side thereof that is configured to engage the second end of one of the clamp mechanisms for securing the elongated base structure to the board.

* * * * *